United States Patent
Zhang et al.

(10) Patent No.: US 11,473,518 B1
(45) Date of Patent: Oct. 18, 2022

(54) METHODS FOR REDUCING COLD START EMISSIONS FOR ENGINES

(71) Applicant: Ford Global Technologies, LLC, Dearborn, MI (US)

(72) Inventors: Xiaogang Zhang, Novi, MI (US); Steven Wooldridge, Manchester, MI (US); Peter C. Moilanen, Ann Arbor, MI (US); Brad VanDerWege, Plymouth, MI (US); Gary Alan Coulson, Ypsilanti, MI (US); Jennifer Fischer, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/445,822

(22) Filed: Aug. 24, 2021

(51) Int. Cl.
| | |
|---|---|
| *F02D 41/06* | (2006.01) |
| *F02P 5/15* | (2006.01) |
| *F02B 75/02* | (2006.01) |
| *F01N 13/10* | (2010.01) |
| *F01N 3/20* | (2006.01) |
| *F02D 13/02* | (2006.01) |

(52) U.S. Cl.
CPC ......... *F02D 41/064* (2013.01); *F01N 3/2033* (2013.01); *F01N 13/10* (2013.01); *F02B 75/02* (2013.01); *F02D 13/0242* (2013.01); *F02P 5/15* (2013.01); *F02B 2075/027* (2013.01)

(58) Field of Classification Search
CPC .. F02D 13/0242; F02D 41/064; F01N 3/2033; F01N 13/10; F02B 75/02; F02B 2075/027; F02P 5/15
See application file for complete search history.

(56) References Cited

U.S. PATENT DOCUMENTS

| | | | | |
|---|---|---|---|---|
| 11,255,240 | B1* | 2/2022 | Glugla | ............... F02B 19/108 |
| 2020/0232325 | A1 | 7/2020 | Nakamura | |

FOREIGN PATENT DOCUMENTS

| | | |
|---|---|---|
| DE | 10131937 A1 | 3/2002 |
| JP | 2006226193 A * | 8/2006 |
| JP | 3829629 B2 * | 10/2006 |
| JP | 4096429 B2 * | 6/2008 |
| JP | 6142662 B2 * | 6/2017 |

OTHER PUBLICATIONS

Crane, M. et al., "Reduced Cold-Start Emissions Using Rapid Exhaust Port Oxidation (REPO) in a Spark-Ignition Engine," Proceedings of the International Congress & Exposition, Feb. 24, 1997, Detroit Michigan, 13 pages.

* cited by examiner

*Primary Examiner* — Audrey B. Walter
(74) *Attorney, Agent, or Firm* — Vincent Mastrogiacomo; McCoy Russell LLP (57) ABSTRACT

Methods are provided for reducing exhaust gas emissions during a cold-start of an engine. In one example, a method may include generating a flame front in an exhaust port of an exhaust system, heating exhaust gas flowing into an emission control device of the exhaust system and thereby expediting the approach to a light-off temperature of the emission control device, and directing the flame front back to the cylinder as part of a combustion stroke of the four-stroke engine cycle.

20 Claims, 6 Drawing Sheets

METHODS FOR REDUCING COLD START EMISSIONS FOR ENGINES

FIELD

The present description relates generally to methods and systems for reducing cold start emissions from an engine.

BACKGROUND/SUMMARY

Engine emission control systems may include one or more exhaust catalysts such as three-way catalysts, NOx storage catalysts, light-off catalysts, and SCR catalysts. At catalyst light-off temperature (e.g., operational temperature), the exhaust catalyst may oxidize and reduce exhaust constituents in an exhaust gas, thereby converting toxic gases and pollutants in the exhaust gas to less toxic pollutants or inert constituents which are then released into the atmosphere. As an example, when operated between 400° C. and 600° C., a three-way catalyst converts reactive nitrogen oxides (NOx), carbon monoxide (CO) and unburned hydrocarbons (HC) into inert constituents such as diatomic nitrogen ($N_2$), carbon dioxide (CO2), and water ($H_2O$). However, during a cold-start of an engine, when a temperature of the exhaust catalyst is below the light-off temperature (e.g., three-way catalyst temperature falls below 400° C.), the exhaust catalyst may not be able to effectively treat the reactive constituents of the exhaust gas, and as a result, cold-start emissions may increase and the toxic constituents in the exhaust gas may be directly released into the atmosphere.

One way to reduce cold-start emissions is to ignite a combustion in exhaust ports of an exhaust manifold, thereby oxidizing excess CO and HCs contained in the exhaust, in addition to rapidly heating the exhaust such that the light-off temperature of the catalyst may be reached in a shorter time, as compared to combustion maintained in a cylinder with both of the exhaust and intake valves closed. One example approach for combusting exhaust in the exhaust ports of the exhaust manifold is given by Crane et al. in "Reduced Cold-Start Emissions Using Rapid Exhaust Port Oxidation (REPO) in a Spark-Ignition Engine." *SAE Transactions*, vol. 106, 1997, pp. 9-19. Therein, the engine is cold-started with an ultra-rich fuel calibration, while near-stoichiometric amounts of air are metered directly into the exhaust ports of the exhaust manifold via pipes equipped with air pumps, each of the pipes coupled to one or more of the exhaust ports. Using this approach, the exhaust constituents, upon leaving the cylinder via the exhaust valve, may spontaneously ignite in the exhaust ports due to the injection of air at near-stoichiometric levels, allowing the exhaust to be rapidly heated, which in turn may rapidly heat the exhaust catalyst to the light-off temperature. Reaching the light-off temperature more rapidly may allow for cold-start emissions to the reduced.

However, the inventors herein have recognized potential issues with such systems. As one example, the example of Crane et al. includes additional components such as pipes equipped with air pumps coupled to each of the exhaust runners of the exhaust manifold to enable the combusting of exhaust in the exhaust ports. Incorporating such additional components to the exhaust manifold may increase manufacturing complexity of the engine and increase manufacturing cost. Further, the enhanced exhaust system of Crane et al. may utilize additional control hardware in order to meter out air at near-stoichiometric ratios, adding additional system complexity. As another example, operating the engine with an ultra-rich fuel calibration during a cold-start phase of engine propulsion may reduce fuel efficiency of the vehicle.

In one example, the issues described above may be addressed by a method for an engine in a vehicle, comprising: generating a combustion front at an exhaust port of a cylinder during a cold-start, combusting an air/fuel mixture via the combustion front at the exhaust port, and directing the combustion front to the cylinder. In this way, catalyst light-off times may be reduced and emission compliance requirements may be met.

As an example, the timing of the exhaust valves opening (EVO) may be adjusted via either a variable valve timing or a variable camshaft timing system. In particular, the EVO may be advanced with respect to the piston reaching top dead center (TDC) during a combustion stroke of a four-stroke engine cycle, in conjunction with an advanced spark timing. Due to the early opening of the exhaust valves, flame kernels within each of the cylinders of the engine may ignite a combustion of an air/fuel mixture flowing out of each of the cylinders and into the exhaust ports as the exhaust valve opens, creating a first combustion front in each of the exhaust ports leading to each of the respective exhaust runners. Following the generation of each of the combustion fronts in each of the exhaust ports, a second combustion front may lead from each of the exhaust ports back to each of the cylinders, allowing for combustion of the air/fuel charge within the cylinder for vehicle propulsion.

In this way, by advancing each of the exhaust valves opening and spark timing during cold-start conditions, first combustion fronts may be generated within the exhaust ports of the exhaust manifold, in addition to second combustion fronts which lead from the exhaust ports to the cylinders of the engine, the first combustion fronts generating heat at the exhaust ports, increasing the catalyst temperature. The technical effect of generating first combustion fronts in the exhaust ports is that exhaust in the exhaust manifold may be rapidly heated, allowing the exhaust catalyst to reach the light-off temperature more rapidly. Further, due to the combustion at the exhaust ports, excess HCs and CO in the exhaust may be oxidized, thereby improving emissions quality. Advancing exhaust valve timing and spark plug timing requires no extra components, allowing for a method to increase exhaust temperatures without increasing manufacturing cost and complexity. Additionally, in contrast to the method of Crane et al., fuel consumption may remain unmodified. Overall, by adjusting timing for EVO and spark, catalyst heating may be expedited without excess fuel consumption, thereby improving emission compliance and fuel economy during an engine cold-start.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
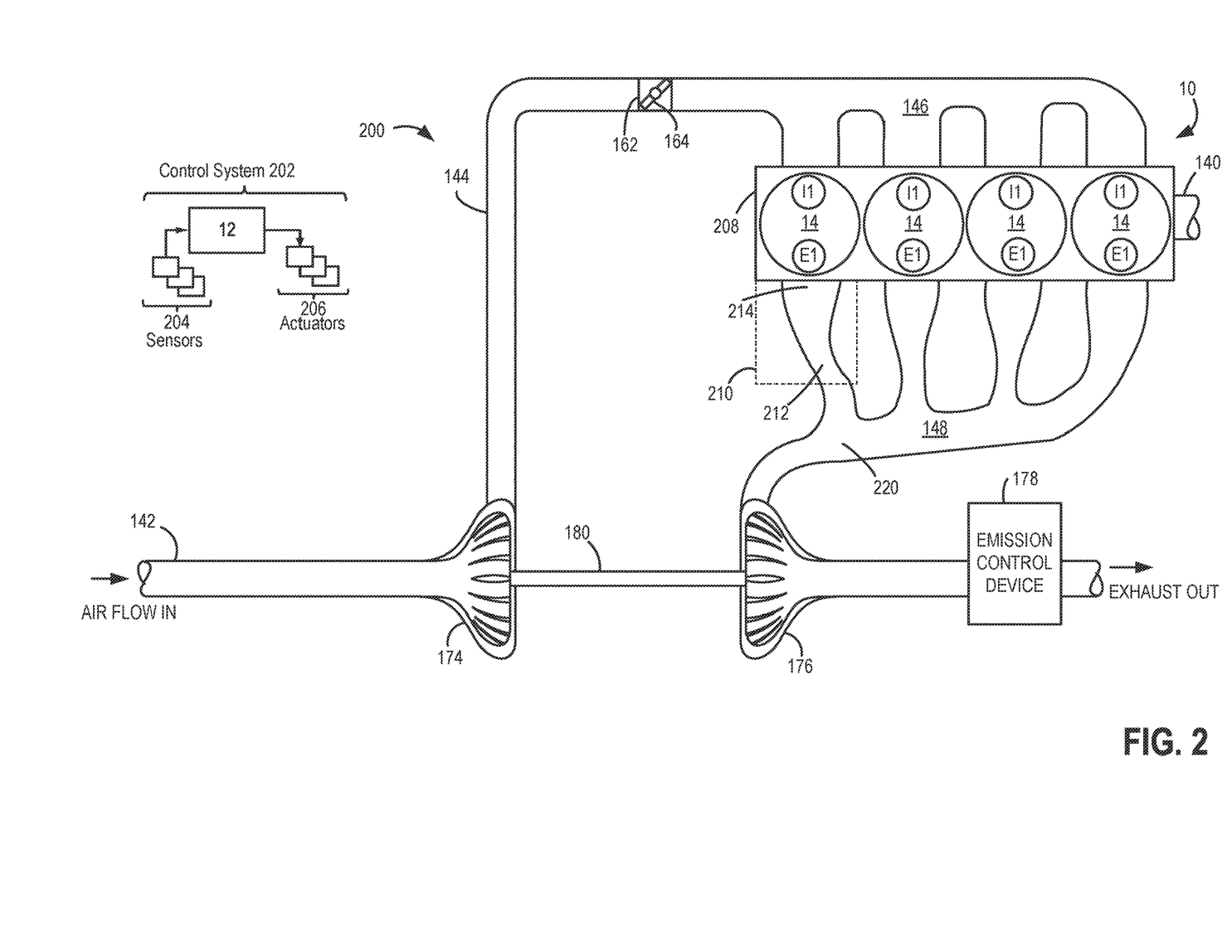
FIG. 2 shows the engine system of FIG. 1 with multiple cylinders coupled to a common exhaust manifold.
Figure 3:
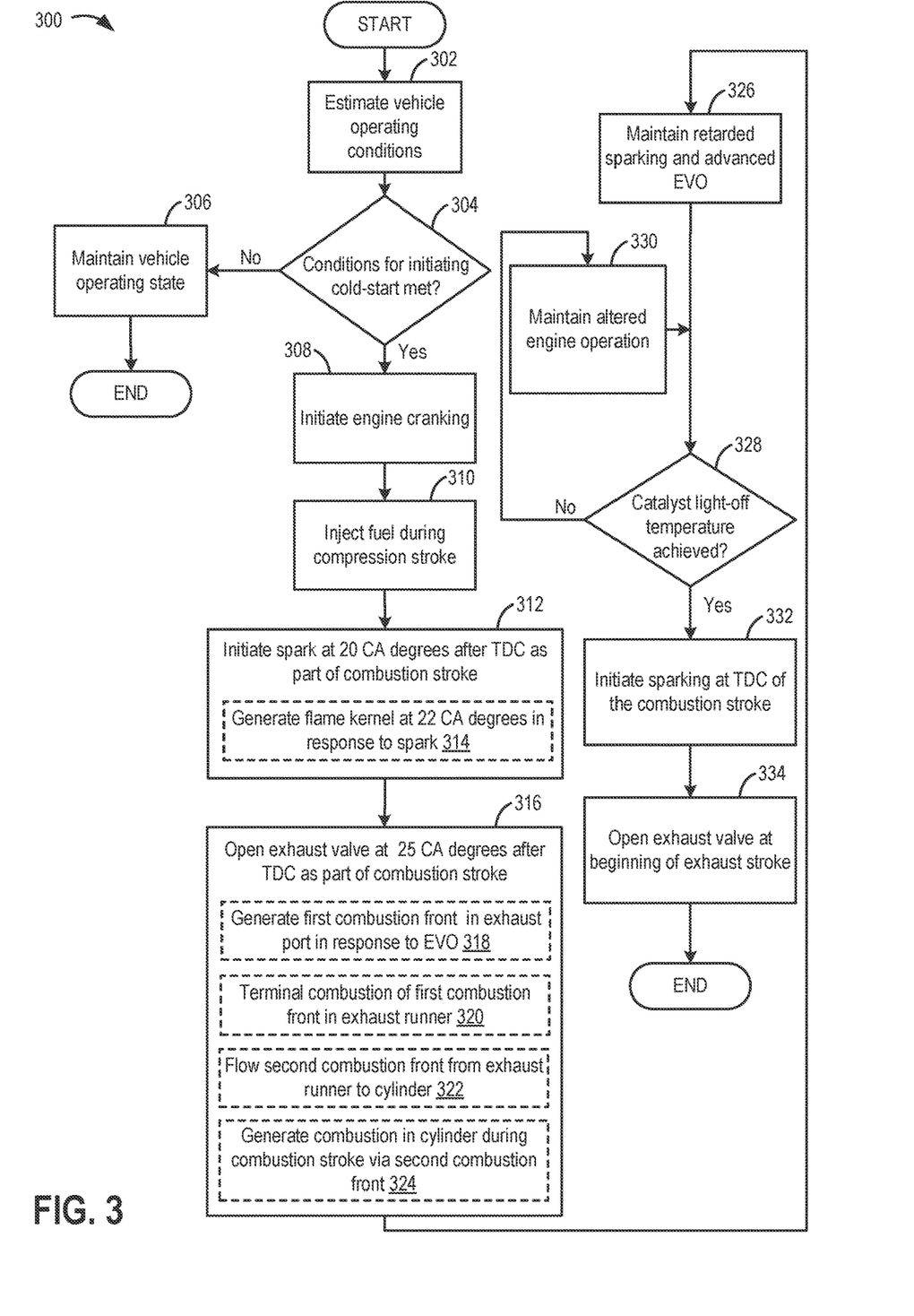
FIG. 3 shows an example method for Cold-Start Emissions Reduction (CSER), including advancing exhaust valve timing and fixing spark timing, within the cylinders of the engine system depicted in FIGS. 1-2.

The following description relates to systems and methods for reducing emissions during a cold-start of an engine in a vehicle. An example vehicle engine is given in FIG. 1, including an exhaust system through which HCs and other combustion byproducts may be treated before exhaust gas is released to the atmosphere. Each cylinder of the engine may be configured with an exhaust valve coupled to an exhaust manifold as shown in FIG. 2. Modified exhaust valve timing in addition to modified spark timing may be implemented at the exhaust valves of each cylinder, thus allowing increased mixing of hot, combusted gases with residual gases in exhaust ports of the exhaust manifold to enhance port oxidation, in addition to expediting light-off of an emission control device. An example method for a CSER control strategy, implementing modified exhaust valve timing and modified spark timing, is given in FIG. 3. A graph comparing a first exhaust valve profile for a first example CSER control strategy and the modified exhaust valve profile corresponding to the method of FIG. 3 is given in FIG. 4. A prophetic example of implementing the method of FIG. 3 for modifying exhaust valve timing and spark timing is given in FIG. 5. By implementing the modified exhaust valve timing and modified spark timing, the exhaust in the exhaust manifold may be heated more rapidly as compared to operation of the exhaust valve without variable timing. A plot comparing the temperatures in the exhaust manifold with the first example CSER control strategy as described in FIG. 4, and the CSER control strategy as described in FIG. 3, is given in FIG. 6.

Figure 1:
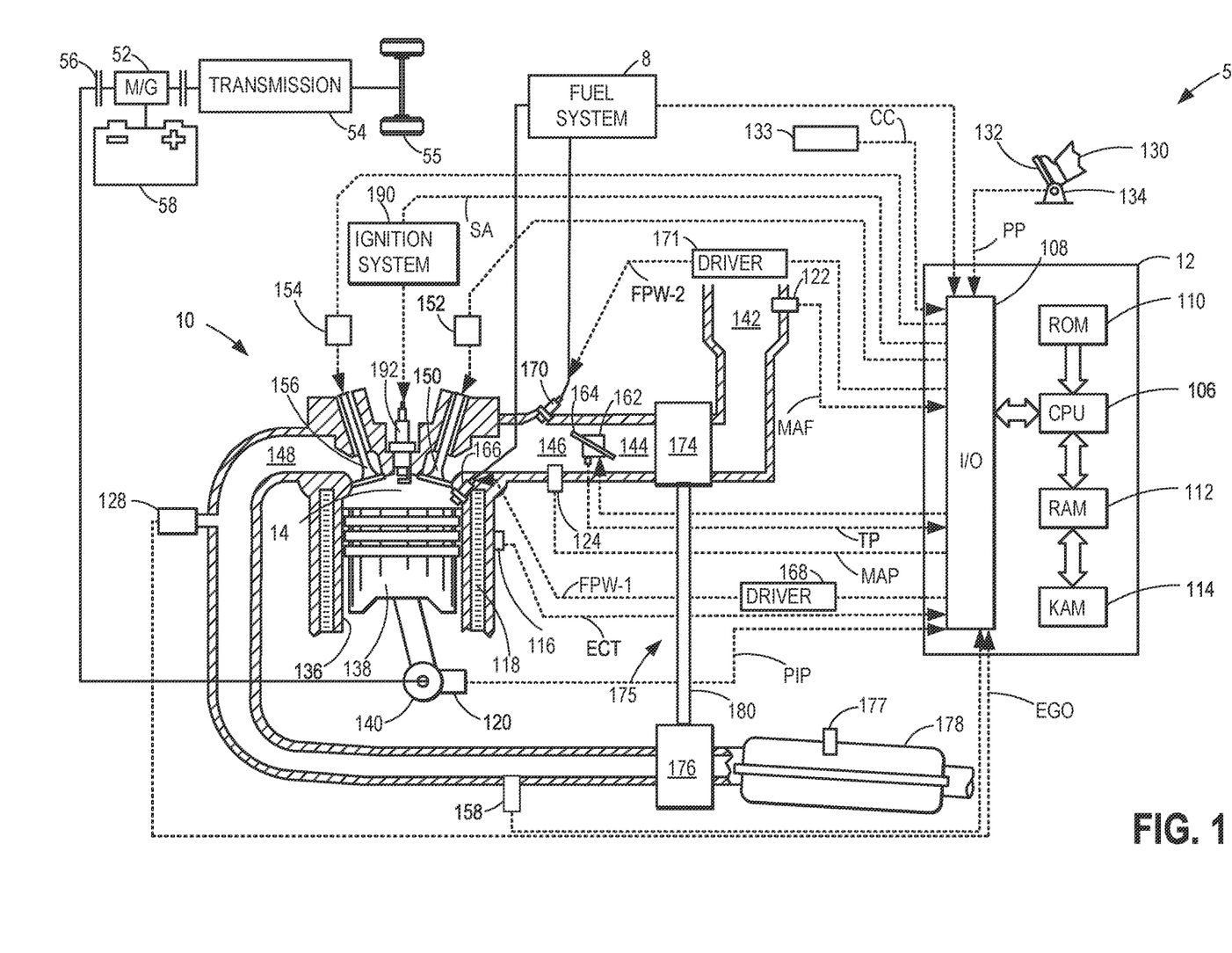
FIG. 1 shows a schematic diagram of an example engine system, depicting a single cylinder.

Turning now to FIG. 1, an example of a cylinder 14 of an internal combustion engine 10 is illustrated, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Also included is an input switch 133 for generating a cruise control signal CC. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one drive wheel 55 of the passenger vehicle via a transmission 54, as described further below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example, during a braking operation. Controller 12 may identify and the amount of electrical energy stored at the energy storage device, which may be referred to as the state of charge (SOC).

Cylinder 14 of engine 10 can receive intake air via an air induction system (AIS) including a series of intake passages 142, 144, and intake manifold 146. Intake manifold 146 can communicate with other cylinders of engine 10 in addition to cylinder 14, as shown in FIG. 2. In some examples, one or more of the intake passages may include a boosting device, such as a turbocharger or a supercharger. For example, FIG. 1 shows engine 10 configured with a turbocharger 175, including a compressor 174 arranged between intake passages 142 and 144 and an exhaust turbine 176 arranged along an exhaust manifold 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

Exhaust manifold 148 can receive exhaust gases from other cylinders of engine 10 in addition to cylinder 14. An exhaust gas sensor 128 is shown coupled to exhaust manifold 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example.

In one example, the emission control device 178 may be a light-off catalyst. In general, the emission control device 178 is configured to catalytically treat the exhaust flow, and thereby reduce an amount of one or more substances in the exhaust flow. For example, the emission control device 178 may be configured to trap $NO_x$ from the exhaust flow when the exhaust flow is lean, and to reduce the trapped $NO_x$ when the exhaust flow is rich. In other examples, the emission control device 178 may be configured to disproportionate NO, or to selectively reduce NO, with the aid of a reducing agent. In still other examples, the emission control device 178 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow. In this way, the emission control device 178 may be a diesel particulate filter (DPF), a three way catalyst (TWC), a NOx trap, a NOx catalyst, selective catalytic reduction (SCR) system, various other emission control devices, or combinations thereof. The emission control device 178 may also be referred to as exhaust catalyst and may further include a temperature sensor 177 that may be used for determining the temperature of the exhaust catalyst.

During an engine cold-start, the temperature of the exhaust catalyst (as determined by the temperature sensor 177, for example) may be below a threshold temperature. In one example, the threshold temperature may be a catalyst light-off temperature. The threshold temperature may also be referred to as a desired temperature. As described previously, when the exhaust catalyst temperature is below the light-off temperature, the exhaust catalyst may not be able to effectively treat the constituents of the exhaust gas. As a result, untreated exhaust gas may be released into the atmosphere.

Engine cold-starts may occur in a variety of circumstances. In one example, a cold-start may be initiated in response to a key-on event, whereby engine torque is used to drive the vehicle 5 while the emission control device 178 is still below the light-off temperature. Engine cold-starts may also occur when the vehicle 5 switches from being propelled by the electric motor 52 powered by an on-board energy source, such as the traction battery 58, to being propelled by the engine 10. As an example, during a cruise condition on a highway, the vehicle 5 may be propelled by the electric motor 52 for some period, due to low torque and power requirements of the cruise condition. However, when transitioning from the cruise condition to an acceleration of the vehicle 5, the battery 58 may have insufficient power to propel the electric motor 52 according to the torque and power demands from a vehicle operator 130. Under these conditions, the vehicle 5 may switch from the electric motor 52 as the main source of propulsion to the engine 10 as the main source of propulsion. However, when transitioning from a period of cruising to acceleration, the engine 10 may have high engine load and engine speed demands under cold-start conditions, which may lead to a large volume of emissions prior to achieving the light-off temperature of the catalyst. A method for modifying exhaust valve timing and modifying spark timing in order to reach the light-off temperature in an expedited time is further described in FIG. 3.

Each cylinder of engine 10 may include one or more intake valves and one or more exhaust valves. For example, cylinder 14 is shown including one intake valve 150 and one exhaust valve 156 located at an upper region of cylinder 14. In some examples, each cylinder of engine 10, including cylinder 14, may include at least two intake valves and at least two exhaust valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal (SA) from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples the engine may ignite the charge by compression as in a diesel engine.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW-1 received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

Fuel injector 170 is shown arranged in intake manifold 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust manifold 148; a profile ignition pickup signal (PIP) from a Hall effect sensor 120 (or other type) coupled to crankshaft 140; throttle position (TP) from a throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold 146. Controller 12 may infer an engine temperature based on the engine coolant temperature and infer a temperature of emission control device 178 based on the signal received from temperature sensor 158. Additional sensors providing data to controller 12 are shown in FIG. 2 and described further below.

Controller 12 receives signals from the various sensors of FIGS. 1 and 2 and employs various actuators of FIGS. 1 and 2 to adjust engine operation based on the received signals and instructions stored on a memory of the controller. For example, upon receiving a signal from the MAP sensor 124, controller 12 may command adjustment of fuel injection as provided by fuel injector 166 or 170 based on the engine temperature detected by the temperature sensor 116 or based on an air-to-fuel ratio inferred based on the signal EGO from the exhaust gas sensor 128.

As described above, FIG. 1 shows one cylinder of a multi-cylinder engine. As such, each cylinder may similarly include its own set of intake/exhaust valves, fuel injector(s), spark plug, etc. It will be appreciated that the engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14. A view of engine 10 with multiple cylinders with each cylinder including an intake valve and an exhaust valve, is shown in FIG. 2.

FIG. 2 shows an example embodiment of an engine system 200, which includes engine 10 of FIG. 1, a control system 202 that includes controller 12 of FIG. 1, and other components depicted in FIG. 1 which are similarly numbered and will not be re-introduced. The control system 202 further includes sensors 204 and actuators 206 as described above with reference to FIG. 1. An engine block 208 is shown in engine system 200 with a plurality of cylinders 14 with intake manifold 146 configured to supply intake air and/or fuel to the cylinders 14 and exhaust manifold 148 configured to exhaust combustion products from the cylinders 14. Ambient air flow may enter the intake system through intake passage 142 and 144.

Cylinders 14 may each be serviced by one or more valves. As shown in FIG. 2, each of the cylinders 14 include a single intake valve I1, which may be the intake valve 150 of FIG. 1, and a single exhaust valve E1, which may be the exhaust valve 156 of FIG. 1. The intake valve I1 may be actuatable between an open position allowing intake air into the cylinders 14 and a closed position blocking intake air from the cylinders by methods described above with reference to FIG. 1. Likewise, the exhaust valve E1 may be actuatable between an open position allowing exhaust gas out of the cylinders 14 and a closed position blocking gases from being released from the cylinders, as described above with reference to FIG. 1.

The exhaust manifold 148 may include exhaust ports coupled to each of the cylinders 14. In some examples (not shown in FIG. 2), the exhaust manifold 148 may also include an exhaust wastegate to allow at least a portion of the exhaust gas flow to bypass the turbine 176. A section of the exhaust manifold 148, as indicated by dashed area 210, is described hereafter and the description of the section shown in dashed area 210 may be applicable to each section of the exhaust manifold 148 coupled to each cylinder 14 of the engine 10.

As shown in dashed area 210, the exhaust valve E1 is coupled to an exhaust port 214. The exhaust port 214 extends and narrows downstream of the cylinders 14 to form an exhaust runner 212. The exhaust runner 212 merges with a common exhaust passage 220 of the exhaust manifold 148 which is similarly coupled to other exhaust runners of the exhaust manifold. As appreciated by FIG. 2, each cylinder of engine 10 includes an exhaust port that extends to form an exhaust runner.

After a combustion cycle, residual exhaust gasses in the exhaust ports may include unreacted HCs. For example, during a drive cycle, combusted exhaust gas flowing through the exhaust system may be hot, enabling at least partial oxidation of HCs in the exhaust ports before the exhaust gases are further treated at the emission control device and then released to the atmosphere. However, when the engine is turned off for a period of time, the engine, including components of the exhaust system, may cool. Subsequent engine startup at low temperature, e.g., a cold start, may result in accumulation of HC residuals in the exhaust ports during initial combustion cycles. For example, a large amount of HCs may be slowly pushed into the exhaust ports from wetting of piston top surfaces prior to closing of the exhaust valves. In addition, a combustion air/fuel ratio may be enriched at cold startup to compensate for low fuel vaporization, further contributing to HC residuals in the exhaust ports. The low temperature of the exhaust gas and low oxygen levels, due to enriched combustion, may lead to undesirably high HC emissions when the exhaust gas is pushed out of the exhaust manifold without mixing with high temperature exhaust gas. A method to reduce HC emissions by modifying exhaust valve timing and spark timing is described in FIG. 3.

In particular, the method described in FIG. 3 may include generating a combustion front at the exhaust port 214 of the cylinder 14 during a cold-start, combusting an air/fuel mixture via the combustion front at the exhaust port, and directing the combustion front to the cylinder. In order to generate the combustion front, spark may be initiated at the cylinder 14 at 20 crankshaft angle (CA) degrees after a piston of the cylinder reaches top dead center (TDC) of a combustion stroke of a four-stroke engine cycle, generating a flame kernel within the cylinder. Following sparking, the exhaust valve of the cylinder may be opened at 25 CA degrees after the piston of the cylinder reaches TDC of the combustion stroke, the air/fuel mixture flowing out of the cylinder into the exhaust port 214 upon the opening of the exhaust valve. Consequently, the air/fuel mixture flowing out of the cylinder 14 into the exhaust port 214 may be ignited by the flame kernel to generate the combustion front at the exhaust port, the combustion front occurring at an upper surface of the exhaust valve, and combusting the air/fuel mixture at the exhaust port and oxidizing exhaust gas present at the exhaust port. Following a terminal combustion within the exhaust runner 212, the combustion front may then expand in a second direction to move from the exhaust port 214 to within the cylinder 14. Upon the combustion front reaching within the cylinder 14, the combustion front may collide with the flame kernel within the cylinder to ignite another combustion within the cylinder as part of the combustion stroke of the four-stroke engine cycle. The modified operation according to FIG. 3 may be maintained until a light-off temperature of the emission control device 178 is attained, after which spark timing may be shifted back to TDC of the combustion stroke, and exhaust valve opening may be shifted back to occurring at initiation of the exhaust stroke.

A method 300 for adjusting exhaust valve timing to expedite attainment of light-off temperature of an emission control device (such as emission control device 178 of FIG. 1) to reduce cold-start emissions during engine operation is shown in FIG. 3. Method 300 may be implemented in a vehicle with an engine system such as the engine system 200 of FIG. 2. Instructions for carrying out method 300 may be executed by a controller, such as controller 12 of FIGS. 1 and 2, based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, method 300 includes estimating and/or measuring current vehicle operating conditions of vehicle 5 of FIG. 1. For example, it may be determined if the engine is operating during propulsion of the vehicle. For example, properties such as engine speed may be inferred based on a PIP signal from a Hall effect sensor, engine load estimated based on a signal from a MAF sensor, engine temperature estimated by a temperature sensor, exhaust temperature estimated via an exhaust temperature sensor, emissions control device temperature estimated via a catalyst temperature sensor, HC levels in exhaust gas detected by one or more HC sensors in the exhaust system, etc. Additionally, it may be determined if the vehicle is operating with torque being delivered to the vehicle via an electric motor, such as the electric motor 52 of FIG. 1. Determining if the vehicle is being driven with torque generated via the electric motor may in one example be determined by assessing a SOC of a traction battery (such as traction battery 58 of FIG. 1) powering the electric motor. Additionally, in the case that the vehicle is being driven by the electric motor, properties of the electric motor may be determined, such as motor speed, motor temperature, etc.

At 304, method 300 includes determining if conditions are met for a cold-start of the engine. One example condition for a cold-start of the engine may be a key-on event initiated by a vehicle operator that starts engine operation while the emissions control device is below the effective temperature range of 400° C. and 600° C., as estimated by a temperature sensor coupled to the emissions control device (such as temperature sensor 177 in FIG. 1) such as after prolonged inactivity of the engine. The temperature of the emissions control device may also be determined as a function of exhaust temperature and/or engine temperature. For example, in a hybrid vehicle, a key-on event initiated by a vehicle operator may activate the engine of the vehicle instead of the electric motor, due to the traction battery powering the electric motor having an insufficient SOC. Another example condition for initiation of a cold-start of the engine may be switching from driving via the electric motor (using motor torque) to driving via the engine (using engine torque) while the emissions control device is not within the effective temperature range of 400° C. and 600° C., as estimated by the temperature sensor. For example, switching from driving the vehicle via the electric motor to driving the vehicle via the engine may be in response to a request for acceleration above the power and torque capacities of the electric motor. One example may include switching from city driving to transitioning to highway driving via an on ramp to the highway, which may utilize an acceleration above the power and torque capacities of the electric motor. Another example may include transitioning from cruise control powered by the electric motor to operation by the engine of the vehicle via a tip-in of the accelerator pedal (such as accelerator pedal of input device 132 of FIG. 1) by a vehicle operator. In another example, switching from driving the vehicle via the electric motor to driving the vehicle via the engine may be in response to the SOC of the traction battery powering the electric motor being below a threshold level, as determined by the controller. The threshold SOC may be a threshold level below which the battery may no longer be able to power the electric motor for a certain period of time (e.g. 5 minutes), given the power and torque demands of the vehicle at the time of operation. If the conditions for cold-start of the engine have not been met, method 300 may proceed to 306 to maintain the current vehicle operating state, and the method may end. In the current vehicle operation, the vehicle may be operated with engine torque and/or motor torque. If the vehicle is operated via engine torque, it may be confirmed that the emissions control device temperature is above its light-off temperature, thereby enabling treatment of exhaust gas passing through the device. If the conditions for a cold-start of the engine are met, method 300 may proceed to 308.

At 308, method 300 includes initiating engine cranking of the vehicle. Initiating cranking of the engine includes cranking the engine via a starter motor. The starter motor may be switched on in response to a key-on event or a request for engine operation from the controller, and may initiate rotation of a crankshaft (such as crankshaft 140 of FIG. 1) of the engine via a flywheel coupled to the crankshaft. An initial cranking of the engine may allow for further engine operation via combustion. In one example, combustion in engine cylinders may be initiated during the cranking of the engine.

Following initiation of cranking of the engine, at 310, method 300 includes injecting fuel during a compression stroke. The compression stroke of a four-stroke engine cycle may follow an initial intake stroke, whereby during the intake stroke air is taken into the cylinder via an intake valve (such as intake valve 150 of FIG. 1) opening and then closing as a piston (such as piston 138 of FIG. 1) moves from TDC to BDC. During the subsequent compression stroke, as the piston moves from BDC to TDC, fuel may be injected via one or more pilot injections prior to the piston reaching TDC, in addition to a main injection upon the piston reaching TDC, the piston thereby compressing an air/fuel mixture within the cylinder.

At 312, method 300 may include initiating spark of the air/fuel charge maintained in the cylinder at 20 crankshaft angle (CA) degrees after the piston reaches TDC of the combustion stroke of the four-stroke engine cycle. Since in a typical engine cycle (such as when the engine is warm and the catalyst is activated), spark is initiated before or at TDC of the combustion stroke, initiating spark 20 CA degrees after the piston reaches TDC of the combustion stroke may comprise retarding spark timing. The piston may reach TDC as part of completing the compression stroke, and starting an immediately subsequent combustion stroke. The position of the piston may be estimated by a crankshaft position sensor (not shown), while inference of being in the combustion stroke may be determined via position signals received by the controller from each of the crankshaft position sensor and a camshaft position sensor (not shown). Combustion within the cylinder may be initiated via a spark plug (such as spark plug 192 of FIG. 1). Upon the controller determining that the piston is 20 CA degrees after TDC of the combustion stroke via receiving signals from each of the camshaft position sensor and the crankshaft position sensor, the controller may then actuate the spark plug to ignite the air/fuel combination maintained in the cylinder.

At 314, in response to initiating spark in 312, a flame kernel may be generated within the cylinder. In one example, the flame kernel may appear within the cylinder at 22 CA degrees after the piston reaches TDC of the combustion stroke, in one example. In another example, the flame kernel may appear later than 22 degrees but before 25 degrees.

At 316, method 300 may include opening an exhaust valve (such as exhaust valve 156 of FIG. 1) 25 CA degrees after the piston reaches TDC of the combustion stroke of the four-stroke engine cycle such as after the spark is initiated (at 20 CA after TDC). As described in 312, determination that the piston has cycled through 25 CA degrees after reaching TDC of the combustion stroke may be determined by the controller via signals received from each of a crankshaft position sensor and a camshaft position sensor. Upon determination by the controller that the piston has cycled through 25 CA degrees after reaching TDC of the combustion stroke, the exhaust valve may be actuated from a fully closed position to an open position. In one embodiment, the exhaust valve may be actuated by the cam actuation system (such as actuator 154 of FIG. 1), which may employ variable cam timing (VCT) via the controller in order to advance the opening of the exhaust valve to occur at 25 CA degrees after TDC of the combustion stroke, or in other words, 155 CA degrees advanced from normal operation, where normal operation may be defined as the exhaust valve opening at the beginning of the exhaust stroke, when the piston reaches BDC. Additionally, the exhaust valve may also utilize variable valve timing (VVT) of the cam actuation system in order to maintain the exhaust valve open for the remainder of the combustion stroke, in addition to the exhaust stroke.

Due to the retarded spark timing and the advanced EVO described herein, a combustion process including two combustion fronts may occur in multiple stages. Following the opening of the exhaust valve at 25 CA degrees at 316 of method 300, a low pressure is generated at the exhaust port causing the air/fuel mixture to flow out of the cylinder and into an exhaust port (such as exhaust port 214 of FIG. 2).

As the air/fuel mixture flows out into the exhaust port due to the EVO, at 318, a first combustion front may be generated within the exhaust port, on a top surface of the exhaust valve. Following an initial formation of the first combustion front within the exhaust port, the first combustion front may further move downstream of the exhaust port, extending from the exhaust port to an exhaust runner (such as exhaust runner 212 of FIG. 2) of an exhaust manifold (such as exhaust manifold 144 of FIG. 1). At the first combustion front, CO and HCs in the air/fuel mixture emanating from the cylinder and the excess CO and HCs contained in the exhaust gas inside the exhaust port and runner may be oxidized.

At 320, following the combustion front flowing into the exhaust runner, terminal combustion of the first combustion front may occur, whereby the first combustion front may no longer extend in the direction along the exhaust runner downstream of the exhaust port. Following the terminal combustion of the first combustion front within the exhaust port and runner, at 322, a second combustion front may flow from the exhaust runner to the cylinder, flowing upstream through each of the exhaust runner, exhaust port, and cylinder. Upon the second combustion front reaching the cylinder, at 324, a combustion may be generated in the cylinder during the combustion stroke via the second combustion front. In particular, upon the entrance of the second combustion front into the cylinder, the second combustion front may collide with the flame kernel, and a combustion may occur within the cylinder, generating a force applied downwards to the piston as part of the remainder of the combustion stroke.

In this way, the retarded spark timing and advanced EVO may generate combustion within each of the exhaust port, exhaust runner and cylinder, allowing rapid heating of the exhaust, oxidation of CO and HCs within the air/fuel mixture and within the exhaust manifold, and generation of a downwards force on the piston as part of the combustion stroke. Details of the exhaust valve profile corresponding to a first CSER control strategy, in comparison to the CSER control strategy of method 300 of FIG. 3, are discussed further in relation to FIG. 4.

At 326, method 300 may include maintaining the retarded spark timing and advanced EVO as part of continued engine operation. The retarded spark timing may be maintained via the controller in response to piston positional signals received by the controller via the crankshaft position sensor, in addition to the controller maintaining a running count of the number of times the piston reached TDC and BDC within a four-stroke cycle, in order to determine which stroke of the four-stroke cycle is currently operating (e.g. if the piston is currently in the combustion stroke). The advanced EVO of the exhaust valve may be maintained by the VCT of the cam actuation system actuated via the controller, while the elongated time that the exhaust valve is maintained opened as compared to normal operation may be maintained by continued operation of the VVT of the cam actuation system actuated via the controller.

At 328, method 300 includes determining if a catalyst light-off temperature is attained. The catalyst light-off temperature may be a threshold temperature beyond which the emission control device may operate efficiency, e.g. a temperature of the emission control device at which oxidation and reduction of constituents of exhaust gas is generated with 50% efficiency. The light-off temperature of the emission control device may be a pre-calibrated value, stored in the non-transitory memory of the controller. In one example, a light-off temperature may be 400° C. The temperature of the emission control device may be estimated based on outputs of one or more of the emission control device temperature sensor, the exhaust temperature sensor, and engine coolant temperature sensor. The emission control device temperature may then be compared to the light-off temperature. If the catalyst light-off temperature is not achieved, method 300 may then proceed to 330 to maintain altered engine operation (e.g. with advanced EVO and retarded spark timing as described above), and then return to 328. Otherwise if the catalyst light-off temperature is achieved, method 300 may proceed to 332 to reestablish nominal spark timing and EVO.

At 332, method 300 includes initiating spark at TDC of the combustion stroke. The spark timing may be reset via the controller to spark upon the piston reaching TDC of the combustion stroke. Following resetting of the spark timing, at 334, method 300 includes opening the exhaust valve at the beginning of the exhaust stroke. Opening the exhaust valve at the beginning of the exhaust stroke may include adjusting cam phasing by commanding off VCT of the cam actuation system via the controller. Additionally, VVT of the cam actuation system may be commanded off via the controller, such that the exhaust valve may be actuated from a fully closed position to opening at the beginning of the exhaust stroke when the piston is at BDC, to being in a fully open position when the piston is halfway between BDC and TDC, back to a fully closed position when the piston reaches BDC. Following 334, method 300 may then end.

In this way, method 300 describes a method for initiating a CSER control strategy, whereby under a first condition, spark may be retarded from top dead center (TDC) of the combustion stroke and the exhaust valve may be opened during a combustion stroke, and under a second condition, spark may be initiated at TDC of the combustion stroke and the exhaust valve may be opened upon completion of the combustion stroke. The first condition may include starting the engine during a cold-start, the cold-start including a temperature of the emission control device being below a light-off temperature, and the second condition may include engine operation with the temperature of the emission control device being higher than the light-off temperature. A transition from the first condition to the second condition may occur in response to the temperature of the emission control device increasing to the light-off temperature, whereby the temperature of the emission control device may increase in response to heating of exhaust gas in the exhaust system during the first condition via the combustion front generated in the exhaust port.

Figure 4:
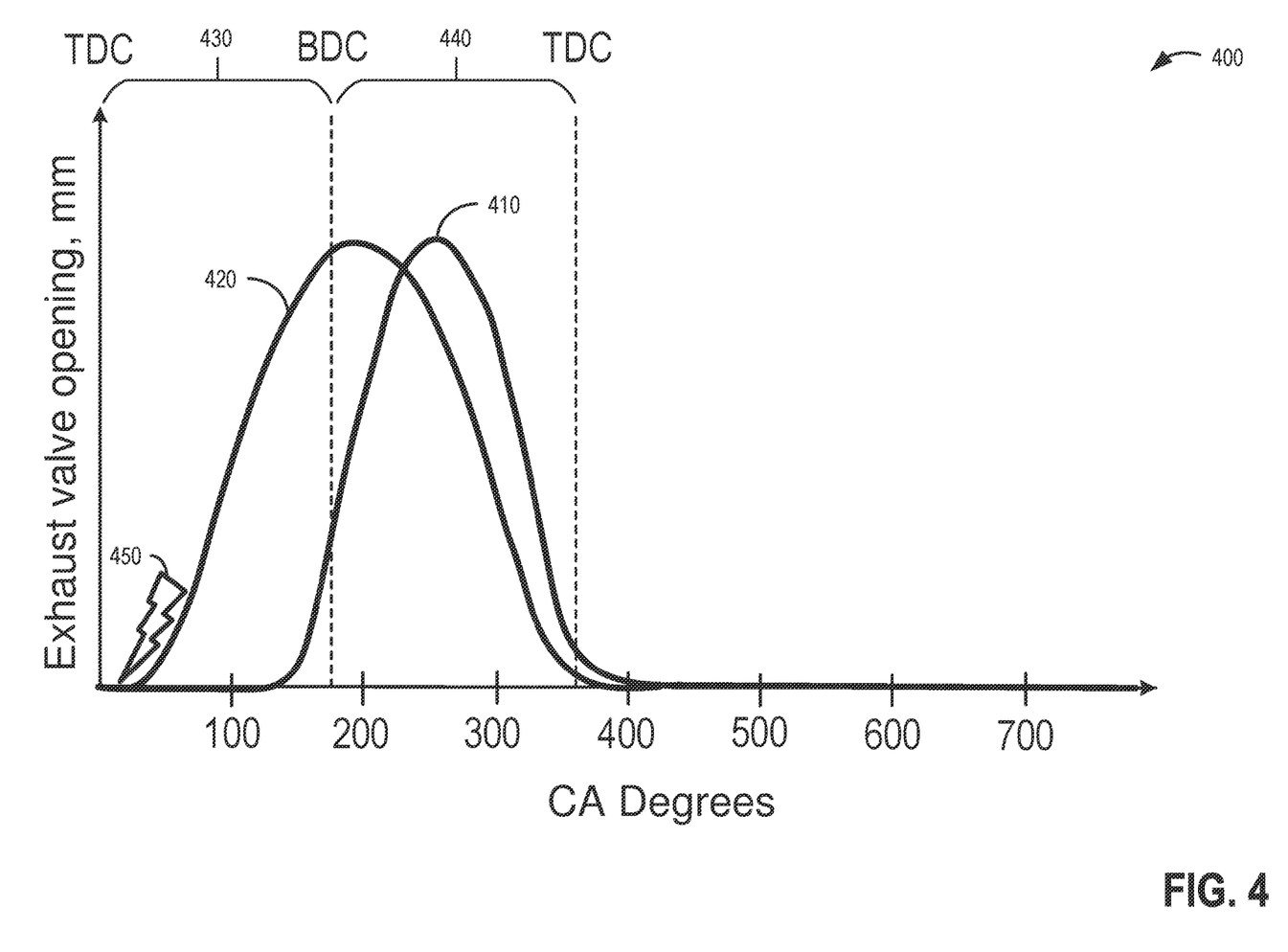
FIG. 4 shows a graph of exhaust valve profiles for an engine cycle during a cold-start and after catalyst light-off, according to the present disclosure.

FIG. 4 shows a graph 400 depicting two different exhaust valve timing profiles for a cylinder. For example, the cylinder may be one of the cylinders 14 depicted in FIG. 2. The x-axis of the graph represents crankshaft angle (CA) degrees and the y-axis of the graph represents exhaust valve opening in millimeters (mm). A first plot 410 depicts a first exhaust valve profile for a first example CSER control strategy, and a second plot 420 depicts a second exhaust valve profile for the CSER control strategy described herein according to method 300 of FIG. 3. The first example CSER control strategy may correspond to opening an exhaust valve (such as exhaust valve 156 of FIG. 1) 140 CA degrees after a piston (such as piston 138 of FIG. 1) reaches TDC of a combustion stroke 430. Additionally, the first example CSER control strategy may initiate spark via a spark plug (such as spark plug 192 of FIG. 1) at 20 CA degrees after TDC of the combustion stroke 430. In another example, spark timing for the first example CSER control strategy may be adjusted to any time from TDC of the combustion stroke to 20 CA degrees after TDC of the combustion stroke. In contrast, the CSER control strategy as described in FIG. 3 may correspond to opening the exhaust valve 25 CA degrees after TDC of the combustion stroke, while initiating spark in the cylinder via the spark plug 20 CA degrees after TDC of the combustion stroke. Both of the plots 410, 420 depict the exhaust valve timing over a CA degree interval including both of the combustion stroke 430 and an exhaust stroke 440. In particular, the first plot 410 depicts opening of the exhaust valve 140 CA degrees after TDC of the combustion stroke 430, or in other words, 40 CA degrees prior to the beginning of the exhaust stroke 440. In contrast, the second plot 420 depicts opening of the exhaust valve 25 degrees after TDC of the combustion stroke 430, or in other words, 155 CA degrees prior to the beginning of the exhaust stroke 440.

Each of the first plot 410 and the second plot 420 may have the same maximum valve lift, however, the exhaust valve profile depicted in the second plot 420 depicts EVO 115 CA degrees prior to the EVO depicted in the first plot 410. Additionally, both of the first plot 410 and the second plot 420 may depict the exhaust valve closing (EVC) at 360 CA degrees after TDC of the combustion stroke 430, as the piston reaches BDC at the end of the exhaust stroke 440. In this way, the exhaust valve profile of the second plot 420 illustrates the exhaust valve open for 115 more CA degrees than depicted in the first plot 410. In the first plot 410, over the whole interval of 220 CA degrees during which the exhaust valve is open, the exhaust valve may fully open at the midpoint of the interval. In one example, the rate of opening over the first half of the interval, as the exhaust valve opens to maximum lift, may be exactly opposite (e.g. of the same magnitude but negative) the rate of closing over the second interval, as the exhaust valve goes from maximum lift to a fully closed position. In another example, the opening and closing rates of the exhaust valve may be asymmetric with respect to the midpoint of the interval. Similarly, in the second plot 420, over the whole interval of 335 CA degrees during which the exhaust valve is open, the exhaust valve may be fully open at the midpoint of the interval. In one example, the rate of opening over the first half of the interval, as the exhaust valve opens to maximum lift, may be exactly opposite the rate of closing over the second half of the interval, as the exhaust valve goes from maximum lift to a fully closed position. In another example, the opening and closing rates of the exhaust valve may be asymmetric with respect to the midpoint of the interval.

The first example CSER strategy depicted in exhaust valve profile of the first plot 410 may allow for opening of the exhaust valve 140 CA degrees after TDC of the combustion stroke 430, or in other words opening the exhaust valve 40 CA degrees before the beginning of the exhaust stroke 440, while initiating spark at 20 CA degrees after TDC of the combustion stroke. Opening the exhaust valve 40 CA degrees before the beginning of the exhaust stroke 440 during the engine cycle may allow for a certain indicated mean effective pressure (IMEP) to be generated within the cylinders during a cold-start as the engine cranks up to a certain rpm, e.g. 1200 rpm, after which EVO may return to opening at the beginning of the exhaust stroke 440. Such an IMEP within the cylinders may help reduce cold-start emissions as the engine speed increases to 1200 rpm. During the first example CSER strategy of the first plot 410, despite an advanced EVO, combustion may still occur entirely within the cylinders.

In contrast, in the CSER strategy of method 300 of FIG. 3 depicted in the exhaust valve profile of the second plot 420 may include fixing spark timing at 20 CA degrees after TDC of the combustion stroke 430, opening the exhaust valve of the cylinder immediately after spark, and generating a first combustion front at an exhaust port of the cylinder and a second combustion front within the cylinder. In particular, the advanced EVO may allow for the first combustion front to occur within an exhaust port (such as exhaust port 214 of FIG. 2), allowing for oxidation of residual CO and HCs in exhaust contained in the exhaust port. In method 300 of FIG. 3, a retarded spark, depicted schematically in FIG. 4 by the lightning bolt icon 450, may occur via the spark plug 20 CA degrees after TDC of the combustion stroke 430. At 22 CA degrees after TDC, a flame kernel may form within the cylinder. At 25 CA degrees after TDC of the combustion stroke 430, 5 CA degrees after the retarded spark, EVO may be initiated, as depicted in the second plot 420. Due to the decrease of pressure inside the cylinder as the piston moves downwards and the cylinder volume expands, the air/fuel mixture in the cylinder may flow outward into the exhaust port and mix with exhaust contained therein. Combustion of the mixture of air and fuel from the cylinder and exhaust contained the exhaust port may then occur within the exhaust port near an upper surface of the exhaust valve. Following combustion within the exhaust port, the first combustion front may flow from the exhaust port to an exhaust runner (such as exhaust runner 212 of FIG. 2), further oxidizing residual CO and HCs in the exhaust contained in the exhaust runner. Following full combustion at the first combustion front, the second combustion front may flow from the exhaust port into the cylinder. The second combustion front may then combine with the flame kernel in the cylinder, allowing for a final combustion to take place within the cylinder as part of the combustion stroke. The combusted air/fuel mixture within the cylinder may then flow out through the exhaust port and exhaust runner and into an exhaust as part of the exhaust stroke of the engine cycle.

In this way, by fixing spark timing at 20 CA degrees after TDC of the combustion stroke and advancing EVO to 155 CA degrees prior to BDC of the exhaust stroke, a first combustion front may be formed, extending from the exhaust port and expanding throughout the exhaust runner, further oxidizing residual CO and HCs in the exhaust gas of an exhaust manifold (such as exhaust manifold 144 of FIG. 2). This reduces residual CO and HCs within the exhaust, in addition to increasing exhaust temperature, allowing for a light-off temperature of an emission control device (such as emission control device 178 of FIG. 2) to be achieved more quickly during a cold-start; both of these factors may reduce emissions during a cold-start as compared to the first example CSER control strategy of first plot 410.

Figure 5:
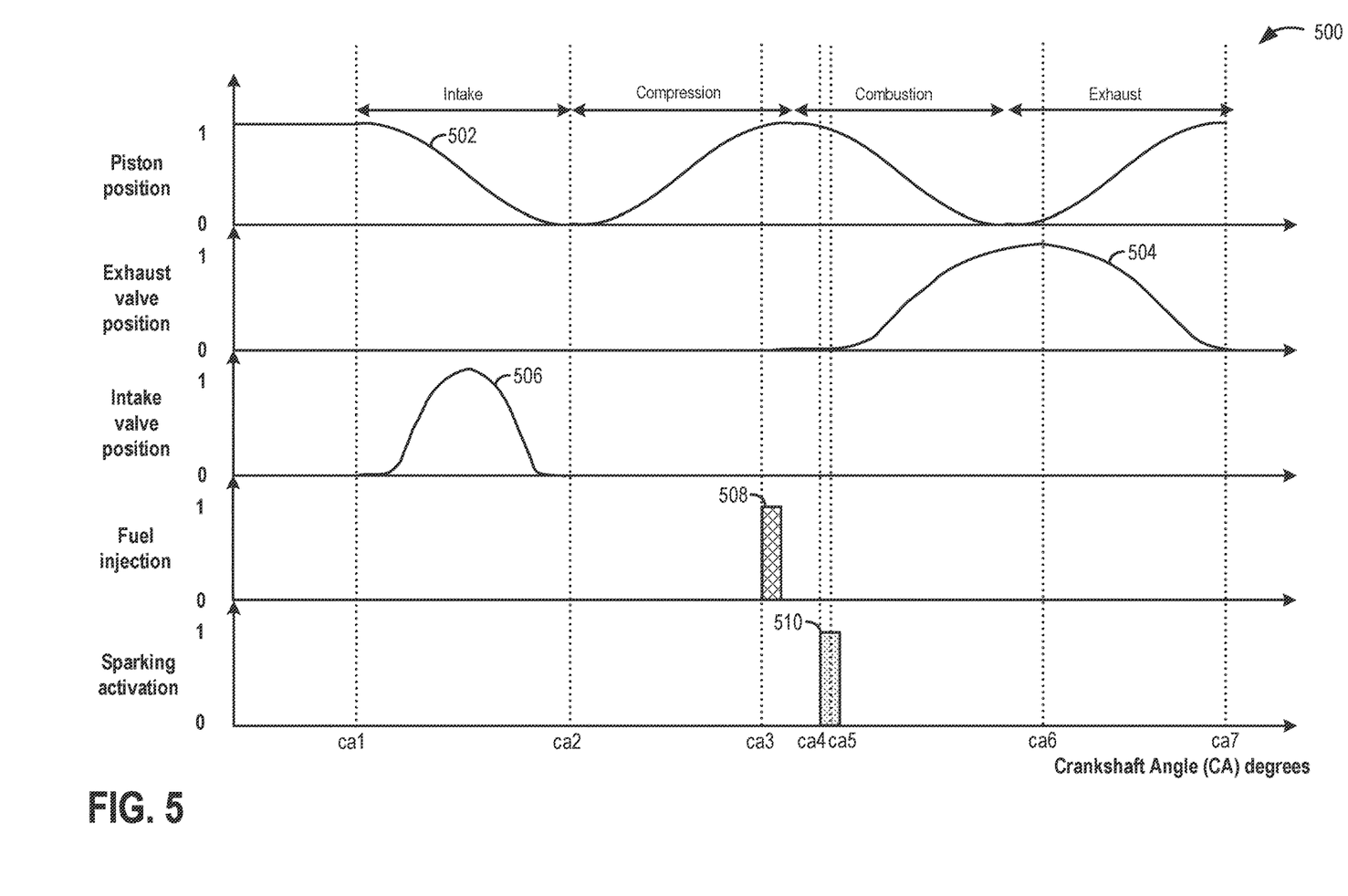
FIG. 5 shows a prophetic example of advancing the exhaust valve timing and fixing the spark timing at 20 CA degrees after TDC in order to reduce time to a catalyst light-off, according to the method of FIG. 3.

Turning now to FIG. 5, map 500 depicts a prophetic example of advancing the exhaust valve timing and fixing the spark timing at 20 CA degrees after TDC as part of a CSER control strategy in a vehicle (such as vehicle 5 of FIG. 1), in accordance with method 300 of FIG. 3. The horizontal (x-axis) denotes Crankshaft Angle (CA) degrees and the vertical markers ca1-ca7 identify significant points in the CSER control strategy.

The map 500 describes a CSER strategy that may be initiated in response to an engine-on condition. The engine-on condition may be initiated in response to a key-on event, or in response to switching from driving the vehicle via an electric motor (such as electric motor 52 of FIG. 1) to driving the vehicle via an engine (such as engine 10 of FIG. 1). The engine may include a plurality of cylinders (such as cylinders 14 of FIGS. 1-2), with each cylinder including a piston (such as piston 138 of FIG. 1). Consequently, an engine-on condition may be reflected in initiating the motion of pistons. The piston position for a single piston is shown in plot 502, including the piston moving through each of an intake stroke, a compression stroke, a combustion stroke, and an exhaust stroke, as part of a four-stroke engine cycle, where 1 on the y-axis indicates TDC, and 0 on the y-axis indicates BDC. During the four-stroke engine cycle, an exhaust valve (such as exhaust valve 156 of FIG. 1) may have a modified exhaust valve timing, in particular with an advanced EVO; a plot of the exhaust valve position is given in plot 504, where 1 on the y-axis indicates a fully open valve position, and 0 on the y-axis indicates a fully closed valve position, and a plot of the intake valve position is given in plot 506, where 1 on the y-axis indicates a fully open valve position, and 0 on the y-axis indicates a fully closed valve position. Fuel may be injected during the compression stroke via a fuel injector (such as fuel injector 166 of FIG. 1); an example plot of fuel injection is given in plot 508, where 1 on the y-axis indicates fuel injection, and 0 on the y-axis indicates fuel injection being in an off state. After fuel is injected, spark may be initiated in a retarded manner by a spark plug (such as spark plug 192 of FIG. 1); an example plot of retarded spark timing is given in example plot 510, where 1 on the y-axis indicates spark, and 0 on the y-axis indicates spark being in an off state.

Prior to ca1, the engine is in an off state. Consequently, the piston is maintained in a fully open position, each of the exhaust and intake valves are closed, fuel injection and spark are turned off, and the CSER control strategy is not implemented.

At ca1, the CSER control strategy is activated, either in response to a key-on event or in response to switching from driving the vehicle by the electric motor to driving the vehicle with the engine. In response to the CSER control strategy being activated, at ca1 the engine is switched on, and in response to the engine activating, at ca1, the piston begins to move down, and the intake valve begins to open.

From ca1 to ca2, the piston cycles through the intake stroke, starting at TDC at ca1 and moving to BDC at ca2. In conjunction with the motion of the piston, at ca1 the intake valve is begins to open, opening to a maximal valve lift as the piston is halfway between TDC and BDC, and again at ca2 fully closing as the piston reaches BDC.

At ca2, the intake valve is fully closed, and the piston begins the compression stroke. From ca2 to ca3, the piston cycles through most of the compression stroke, cycling from BDC to almost TDC. During this time, the intake and exhaust valve remain closed, fuel injection remains off, and spark is not initiated.

At ca3, as the piston has nearly reached TDC as part of the compression stroke, fuel is injected into the cylinder via the fuel injector. While in this example plot 510 shows a single fuel injection, in one example, during fuel injection there can be one or more pilot injections, followed by a main injection.

From ca3 to ca4, the piston cycles through the end of the compression stroke and part of the combustion stroke, with the piston position ending up 20 CA degrees through the beginning of the combustion stroke. During this time, the intake and exhaust valve continue to remain closed, and spark is not initiated.

At ca4, in response to the piston reaching 20 CA degrees of the combustion stroke, spark is initiated, retarded relative to a normal spark timing, which may occur at the end of the compression stroke, as the piston reaches TDC as part of the beginning of the combustion stroke.

Shortly after spark initiation, at ca5, as the piston has cycled through 25 CA degrees of the combustion stroke, the exhaust valve is opened. The exhaust valve opening is advanced 155 CA degrees relative to a typical EVO, a typical EVO happening as the piston reaches BDC at the beginning of the exhaust stroke. During this time, the intake valve continues to remain closed, and fuel injection and spark remain off.

From ca5 to ca6, the piston further cycles through the combustion stroke and a small fraction of the exhaust stroke. During this time, the exhaust valve is opening, and at ca6, the small fraction of the way into the exhaust stroke, the exhaust valve reaches a fully open position with maximum valve lift. During this time, the intake valve continues to remain closed, and fuel injection and spark remain off.

From ca6 to ca7, the piston continues to cycle through a remainder of the exhaust stroke, moving to TDC. During this time, the exhaust valve is closing from the fully open position achieved at ca6, and at ca7 reaches a fully closed position. After ca7, the engine cycle illustrated in the time interval from ca1-ca7, which was initiated in response to CSER activation, continues, until a light-off temperature of an emission control device (such has emission control device 178 of FIGS. 1-2) is achieved.

Figure 6:
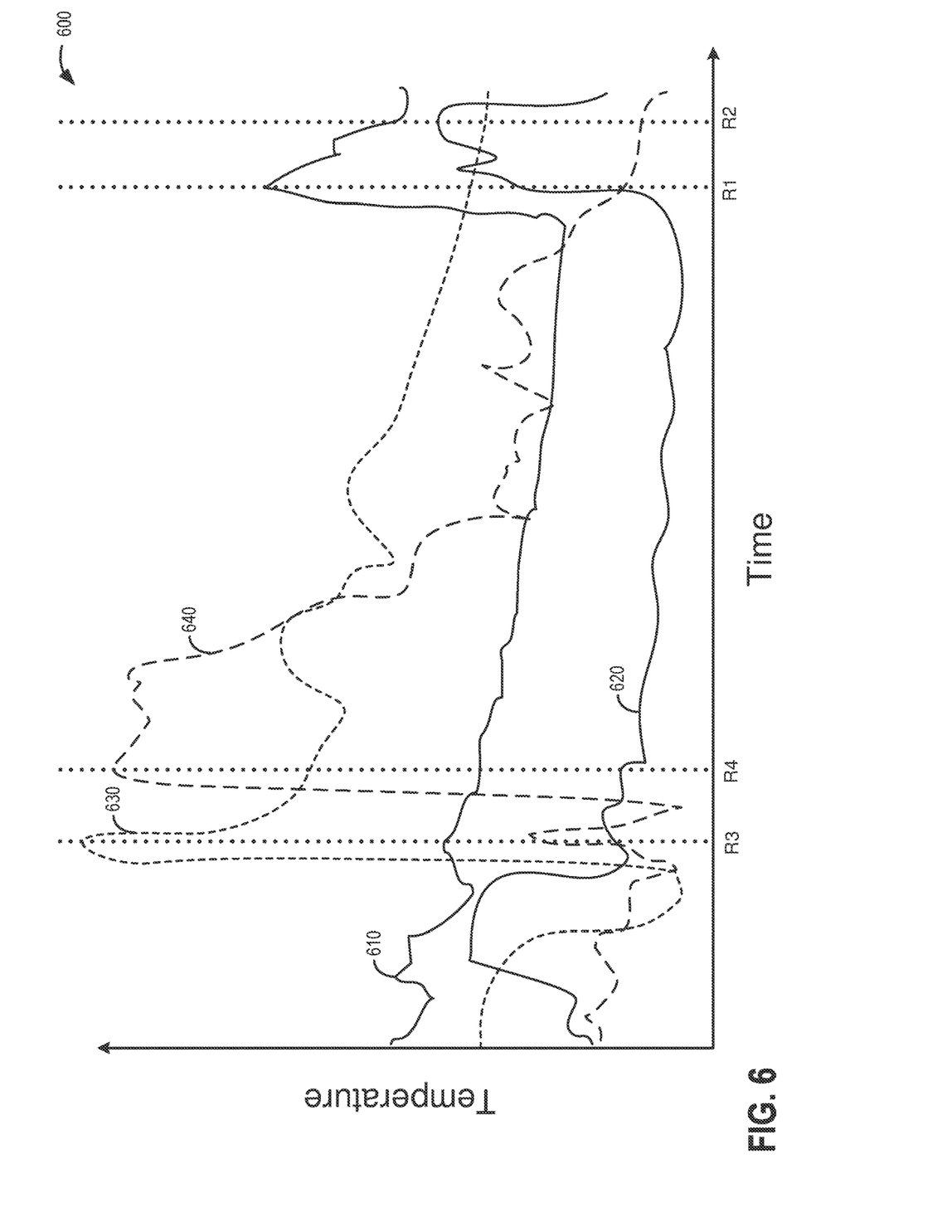
FIG. 6 shows an example plot of temperatures at two different positions along the exhaust runner in a first example with application of a first example CSER control strategy, and in a second example with application of the example method for CSER described in FIG. 3.

FIG. 6 shows an example plot of exhaust gas temperatures as a function of time at a first point P1 in an exhaust runner (such as exhaust runner 212 of FIG. 2) downstream of an exhaust port (such as exhaust port 214 of FIG. 2), and at a second point P2 downstream each of the exhaust port and P1. The x-axis indicates time, where the time interval indicated is over the combustion (power) stroke of a four-stroke cycle. The y-axis indicates temperature. The first plot 610 and the second plot 620 are plots of the temperature of exhaust gas at P1 and P2, respectively, and are generated in response to implementing a first example CSER control strategy as described in relation to FIG. 4, whereby spark is initiated at 20 CA degrees after TDC of the combustion stroke, while EVO is initiated 140 CA degrees after TDC of the combustion stroke. The third plot 630 and the fourth plot 640 are plots of the temperature of exhaust gas at P1 and P2, respectively, in response to implementing the CSER control strategy of method 300 of FIG. 3, whereby spark is initiated 20 CA degrees after TDC of the combustion stroke, and EVO is initiated 25 CA degrees after TDC of the combustion stroke, advanced 115 CA degrees from the EVO implemented in the first example CSER control strategy.

In first plot 610, the exhaust gas temperature starts at an initial value, fluctuating but generally decreasing with time, when at a certain time, the temperature begins to spike, reaching a maximum value at time R1, in response to heated exhaust gases from the cylinder reaching point P1 in the exhaust runner. Similarly, in second plot 620, the temperature starts at an initial value, fluctuating but generally decreasing with time, when at a certain time, the temperature begins to spike, reaching a maximum value at R2, in response to heated exhaust gases from the cylinder reaching point P2 in the exhaust runner. The peak in exhaust gas temperature of second plot 620 at time R2 is less than the peak of the exhaust gas temperature at time R1 of first plot 610 due to continuous exhaust gas heat loss from point P1 to point P2; additionally, the time R2 is greater than time R1, due to the fact that the point P2 is downstream of point P1.

As shown in third plot 630, due to a first combustion front achieved within the CSER strategy of method 300 of FIG. 3, the exhaust gas temperature at P1 rapidly increases to a peak value of temperature at time R3. The peak value of exhaust gas temperature at R3 in third plot 630 is greater than the peak temperatures achieved at time R1 and time R2, with the peak exhaust gas temperature at time R3 in third plot 630 being approximately 30% greater than the peak exhaust gas temperature at time R1 of first plot 610. Additionally, time R3 occurs earlier than both of time R1 and time R2, time R3 occurring within the first fifth of the time interval shown on the x-axis of plot 600, whereas time R1 and time R2 occur within the last fifth of the time interval shown on the x-axis of plot 600. This is because that exhaust valve opening is advanced to early in the combustion stroke (5 CA degrees after the spark timing) for plots 630 and 640. Upon achieving the peak exhaust gas temperature at time R3, the temperature of third plot 630 may decrease over the remainder of the time interval shown on the x-axis of plot 600. Similarly, in fourth plot 640, the exhaust gas temperature at P2 rapidly increases to a peak value of temperature at time R4, the peak temperature of fourth plot 640 at R4 being slightly less than the peak temperature at time R3 of third plot 630. Additionally, time R4 is greater than time R3 and also occurring within the second fifth of the time interval shown on the x-axis of plot 600, due to the time taken for the first combustion front to travel from P1 to P2. Upon achieving the peak exhaust gas temperature at time R4, the temperature of fourth plot 640 may decrease over the remainder of the time interval shown on the x-axis of plot 600. In this way, by implementing the CSER control strategy of method 300 of FIG. 3, the exhaust gas temperature at points P1, P2 may peak earlier than with the first example CSER control strategy, and the temperature peaks at P1, P2 may be greater with the CSER control strategy of method 300 of FIG. 3 than with the first example CSER control strategy.

In this way, by fixing spark timing at 20 CA degrees after TDC of the beginning of the combustion stroke and advancing EVO 155 CA degrees before BDC of the beginning of the exhaust stroke, exhaust gas may combust within the exhaust port, leading to reduced levels of CO and HCs in the exhaust, in addition to increasing the temperature of the exhaust gas, hastening the approach to a light-off temperature of the emission control device. The technical effect of the retarded spark timing and advanced EVO timing mentioned above is that a first combustion front may be generated in the exhaust port leading to the exhaust runner of the exhaust manifold, followed by a second combustion front leading from the exhaust port to the cylinder, the second combustion front generating combustion within the cylinder as part of the combustion stroke. By employing the modified CSER control strategy described herein, excess CO and HCs in the exhaust gas of the exhaust manifold may be further oxidized. Overall, by expediting attainment of light-off of the emissions control device while concurrently oxidizing unburnt hydrocarbons, cold-start emissions may be reduced.

The disclosure provides support for a method for an engine in a vehicle, comprising: generating a combustion front at an exhaust port of a cylinder during a cold-start, combusting an air/fuel mixture via the combustion front at the exhaust port, and directing the combustion front to the cylinder. In a first example of the method, the method further comprises: initiating a spark at the cylinder at 20 crankshaft angle (CA) degrees after a piston of the cylinder reaches top dead center (TDC) of a combustion stroke of a four-stroke engine cycle. In a second example of the method, optionally including the first example, the method further comprises: generating a flame kernel within the cylinder in response to the spark igniting the air/fuel mixture within the cylinder. In a third example of the method, optionally including one or both of the first and second examples, generating the combustion front at the exhaust port is in response to an opening of an exhaust valve of the cylinder at 25 CA degrees after the piston of the cylinder reaches TDC of the combustion stroke, the air/fuel mixture flowing out of the cylinder into the exhaust port upon the opening of the exhaust valve. In a fourth example of the method, optionally including one or more or each of the first through third examples, the air/fuel mixture flowing out of the cylinder into the exhaust port is ignited by the flame kernel to generate the combustion front at the exhaust port, the combustion front combusting the air/fuel mixture at the exhaust port and oxidizing exhaust gas present at the exhaust port. In a fifth example of the method, optionally including one or more or each of the first through fourth examples, the combustion front is at an upper surface of the exhaust valve inside the exhaust port, the exhaust valve maintained open until an end of an exhaust stroke of the four-stroke engine cycle. In a sixth example of the method, optionally including one or more or each of the first through fifth examples, the combustion front expands in a first direction from the exhaust port downstream to an exhaust runner, the combustion front further combusting exhaust gas included in the exhaust runner. In a seventh example of the method, optionally including one or more or each of the first through sixth examples, the method further comprises: attaining a terminal combustion within the exhaust runner, followed by the combustion front expanding in a second direction to move from the exhaust port to within the cylinder. In an eighth example of the method, optionally including one or more or each of the first through seventh examples, the method further comprises: upon the combustion front reaching within the cylinder, igniting another combustion within the cylinder as part of the combustion stroke of the four-stroke engine cycle. In a ninth example of the method, optionally including one or more or each of the first through eighth examples, the method further comprises: in response to attainment of light-off in an exhaust catalyst, shifting spark timing to the TDC of the combustion stroke and opening the exhaust valve at an initiation of the exhaust stroke.

The disclosure also provides support for a method for an engine in a vehicle, comprising: during a first condition, fixing spark from at 20 CA degrees after top dead center (TDC) of a piston position and opening an exhaust valve during a combustion stroke, and during a second condition, initiating spark at TDC and opening the exhaust valve at initiation of an exhaust stroke upon completion of the combustion stroke. In a first example of the method, the first condition includes starting the engine during a cold-start, the cold-start including a temperature of an emission control device of an exhaust system being below a light-off temperature, and wherein the second condition includes engine operation with the temperature of the emission control device being higher than the light-off temperature. In a second example of the method, optionally including the first example, during the first condition, for a cylinder in the engine, the spark is fixed to occur at 20 crankshaft angle (CA) degrees after TDC of the combustion stroke, and wherein an exhaust valve opening (EVO) is advanced to occur at 25 CA degrees after TDC of the combustion stroke, an exhaust valve closing (EVC) occurring at an end of the exhaust stroke. In a third example of the method, optionally including one or both of the first and second examples, the method further comprises: transitioning from the first condition to the second condition in response to the temperature of the emission control device increasing to the light-off temperature, the temperature of the emission control device increasing in response to heating of exhaust gas in the exhaust system during the first condition via a combustion front generated in an exhaust port of the exhaust system. In a fourth example of the method, optionally including one or more or each of the first through third examples, the combustion front is generated upon flow of an air/fuel mixture flowing from the cylinder of the engine to the exhaust port following EVO, the air/fuel mixture combusted in the exhaust port. In a fifth example of the method, optionally including one or more or each of the first through fourth examples, the method further comprises: a flame front travelling from the exhaust port to an exhaust runner of the exhaust system, the flame front combusting exhaust gas within the exhaust runner, heating the exhaust gas, the heated exhaust gas flowing from the exhaust runner to the emission control device.

The disclosure also provides support for a system for an engine in a vehicle, comprising: a controller storing instructions in non-transitory memory that, when executed, cause the controller to: during a cold-start condition, for a cylinder of the engine, retard spark timing from top dead center (TDC), open an exhaust valve of the cylinder immediately after spark, and generate a first combustion front at an exhaust port of the cylinder and a second combustion front within the cylinder. In a first example of the system, retarding spark timing includes fixing spark timing at 20 crankshaft angle (CA) degrees after TDC of a combustion stroke of a four-stroke engine cycle, and wherein opening an exhaust valve of the cylinder immediately after spark includes opening an exhaust valve 25 CA degrees after TDC of the combustion stroke. In a second example of the system, optionally including the first example, generating the first combustion front in the exhaust port of the cylinder includes moving a flame kernel from the cylinder to the exhaust port in a first direction, combusting an air/fuel mixture and oxidizing hydrocarbons in the exhaust port, the air/fuel mixture flowing out of the cylinder and into the exhaust port of the cylinder following opening of the exhaust valve. In a third example of the system, optionally including one or both of the first and second examples, generating the second combustion front includes, after combusting the air/fuel mixture at the exhaust port and in an exhaust runner, moving the flame kernel from the exhaust port to the cylinder in a second direction, and combusting air/fuel mixture remaining in the cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine in a vehicle, comprising:
generating a combustion front at an exhaust port of a cylinder during a cold-start, combusting an air/fuel mixture via the combustion front at the exhaust port, and directing the combustion front to the cylinder.

2. The method of claim 1, further comprising, initiating a spark at the cylinder at 20 crankshaft angle (CA) degrees after a piston of the cylinder reaches top dead center (TDC) of a combustion stroke of a four-stroke engine cycle.

3. The method of claim 2, further comprising, generating a flame kernel within the cylinder in response to the spark igniting the air/fuel mixture within the cylinder.

4. The method of claim 3, wherein generating the combustion front at the exhaust port is in response to an opening of an exhaust valve of the cylinder at 25 CA degrees after the piston of the cylinder reaches TDC of the combustion stroke, the air/fuel mixture flowing out of the cylinder into the exhaust port upon the opening of the exhaust valve.

5. The method of claim 4, wherein the air/fuel mixture flowing out of the cylinder into the exhaust port is ignited by the flame kernel to generate the combustion front at the exhaust port, the combustion front combusting the air/fuel mixture at the exhaust port and oxidizing exhaust gas present at the exhaust port.

6. The method of claim 5, wherein the combustion front is at an upper surface of the exhaust valve inside the exhaust port, the exhaust valve maintained open until an end of an exhaust stroke of the four-stroke engine cycle.

7. The method of claim 6, wherein the combustion front expands in a first direction from the exhaust port downstream to an exhaust runner, the combustion front further combusting exhaust gas included in the exhaust runner.

8. The method of claim 7, further comprising, attaining a terminal combustion within the exhaust runner, followed by the combustion front expanding in a second direction to move from the exhaust port to within the cylinder.

9. The method of claim 8, further comprising, upon the combustion front reaching within the cylinder, igniting another combustion within the cylinder as part of the combustion stroke of the four-stroke engine cycle.

10. The method of claim 9, further comprising, in response to attainment of light-off in an exhaust catalyst, shifting spark timing to the TDC of the combustion stroke and opening the exhaust valve at an initiation of the exhaust stroke.

11. A method for an engine in a vehicle, comprising:
during a first condition, fixing spark at 20 CA degrees after top dead center (TDC) of a piston position and opening an exhaust valve during a combustion stroke; and
during a second condition, initiating spark at TDC and opening the exhaust valve at initiation of an exhaust stroke upon completion of the combustion stroke.

12. The method of claim 11, wherein the first condition includes starting the engine during a cold-start, the cold-start including a temperature of an emission control device of an exhaust system being below a light-off temperature, and wherein the second condition includes engine operation with the temperature of the emission control device being higher than the light-off temperature.

13. The method of claim 12, wherein during the first condition, for a cylinder in the engine, the spark is fixed to occur at 20 crankshaft angle (CA) degrees after TDC of the combustion stroke, and wherein an exhaust valve opening (EVO) is advanced to occur at 25 CA degrees after TDC of the combustion stroke, an exhaust valve closing (EVC) occurring at an end of the exhaust stroke.

14. The method of claim 13, further comprising, transitioning from the first condition to the second condition in response to the temperature of the emission control device increasing to the light-off temperature, the temperature of the emission control device increasing in response to heating of exhaust gas in the exhaust system during the first condition via a combustion front generated in an exhaust port of the exhaust system.

15. The method of claim 14, wherein the combustion front is generated upon flow of an air/fuel mixture flowing from the cylinder of the engine to the exhaust port following EVO, the air/fuel mixture combusted in the exhaust port.

16. The method of claim 15, further comprising, a flame front travelling from the exhaust port to an exhaust runner of the exhaust system, the flame front combusting exhaust gas within the exhaust runner, heating the exhaust gas, the heated exhaust gas flowing from the exhaust runner to the emission control device.

17. A system for an engine in a vehicle, comprising:
a controller storing instructions in non-transitory memory that, when executed, cause the controller to:
during a cold-start condition, for a cylinder of the engine, retard spark timing from top dead center (TDC);
open an exhaust valve of the cylinder immediately after spark; and
generate a first combustion front at an exhaust port of the cylinder and a second combustion front within the cylinder.

18. The system of claim 17, wherein retarding spark timing includes fixing spark timing at 20 crankshaft angle (CA) degrees after TDC of a combustion stroke of a four-stroke engine cycle, and wherein opening an exhaust valve of the cylinder immediately after spark includes opening an exhaust valve 25 CA degrees after TDC of the combustion stroke.

19. The system of claim 18, wherein generating the first combustion front in the exhaust port of the cylinder includes moving a flame kernel from the cylinder to the exhaust port in a first direction, combusting an air/fuel mixture and oxidizing hydrocarbons in the exhaust port, the air/fuel mixture flowing out of the cylinder and into the exhaust port of the cylinder following opening of the exhaust valve.

20. The system of claim 19, wherein generating the second combustion front includes, after combusting the air/fuel mixture at the exhaust port and in an exhaust runner, moving the flame kernel from the exhaust port to the cylinder in a second direction, and combusting air/fuel mixture remaining in the cylinder.

\* \* \* \* \*

UNITED STATES PATENT AND TRADEMARK OFFICE
CERTIFICATE OF CORRECTION

| | | |
|---|---|---|
| PATENT NO. | : 11,473,518 B1 | Page 1 of 1 |
| APPLICATION NO. | : 17/445822 | |
| DATED | : October 18, 2022 | |
| INVENTOR(S) | : Xiaogang Zhang et al. | |

It is certified that error appears in the above-identified patent and that said Letters Patent is hereby corrected as shown below:

In the Specification

Column 1, Line 3, please add the following statement directly under the Title:
-- "This invention was made with government support under DE-AC02-06CH11357 awarded by the U.S. Department of Energy. The government has certain rights in the invention." --

Signed and Sealed this
Twenty-first Day of May, 2024

Katherine Kelly Vidal
*Director of the United States Patent and Trademark Office*